(12) United States Patent
Schmitt

(10) Patent No.: US 7,475,827 B2
(45) Date of Patent: Jan. 13, 2009

(54) FLUID MIXER

(75) Inventor: Randall Paul Schmitt, Clinton Township, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 478 days.

(21) Appl. No.: 11/109,283

(22) Filed: Apr. 19, 2005

(65) Prior Publication Data

US 2006/0231637 A1 Oct. 19, 2006

(51) Int. Cl.
*G05D 23/13* (2006.01)

(52) U.S. Cl. .............. 236/12.11; 236/12.12; 236/12.15; 236/12.21

(58) Field of Classification Search ................ 236/12.1, 236/12.11, 12.12, 12.15, 12.16, 12.21
See application file for complete search history.

(56) References Cited

U.S. PATENT DOCUMENTS

| | | | |
|---|---|---|---|
| 3,565,791 A | 2/1971 | Urquhart et al. | |
| 3,642,021 A | 2/1972 | Muller et al. | |
| 3,685,541 A | 8/1972 | Caparone et al. | |
| 3,695,903 A | 10/1972 | Telkes et al. | |
| 3,721,386 A | 3/1973 | Brick et al. | |
| 3,750,701 A | 8/1973 | Botnick | |
| 3,952,796 A | 4/1976 | Larson | |
| 4,051,869 A | 10/1977 | Holt et al. | |
| 4,102,354 A | 7/1978 | Natale | |
| 4,121,761 A | 10/1978 | Nolden | |
| 4,150,817 A | 4/1979 | Regelin et al. | |
| 4,166,575 A | 9/1979 | Sassi | |
| 4,170,245 A | 10/1979 | Haley | |
| 4,181,252 A | 1/1980 | Nolden | |
| 4,185,771 A | 1/1980 | Killias | |
| 4,189,792 A | 2/1980 | Veach | |
| 4,222,410 A | 9/1980 | Geimer | |
| 4,227,548 A | 10/1980 | Botnick | |
| 4,241,868 A | 12/1980 | Perkins | |
| 4,258,751 A | 3/1981 | Humpert | |
| 4,270,570 A | 6/1981 | Kolze | |
| 4,322,031 A | 3/1982 | Gehlert | |
| 4,330,081 A | 5/1982 | McMillan | |
| 4,359,186 A | 11/1982 | Kiendl | |
| 4,402,455 A | 9/1983 | Kolt | |
| 4,406,398 A | 9/1983 | Perkins | |
| 4,409,694 A | 10/1983 | Barrett, Sr. et al. | |
| 4,420,811 A | 12/1983 | Tarnay et al. | |
| 4,421,269 A | 12/1983 | Ts'ao | |
| 4,429,422 A | 2/1984 | Wareham | |
| 4,444,357 A | 4/1984 | Lynch et al. | |
| 4,455,475 A | 6/1984 | Giorgetti | |
| 4,478,249 A | 10/1984 | Fleischmann | |
| 4,503,575 A | 3/1985 | Knoop et al. | |
| 4,524,906 A | 6/1985 | Kenyon et al. | |
| 4,528,709 A | 7/1985 | Getz | |
| 4,541,562 A | 9/1985 | Zukausky | |
| 4,558,817 A | 12/1985 | Kiendl | |
| 4,560,284 A | 12/1985 | Chen | |
| 4,563,780 A | 1/1986 | Pollack | |

(Continued)

FOREIGN PATENT DOCUMENTS

DE 3407796 A1 9/1985

*Primary Examiner*—Marc E Norman
(74) *Attorney, Agent, or Firm*—Leon E. Redman

(57) ABSTRACT

A fluid mixer including a mixing element configured to separate and mix hot and cold water streams.

13 Claims, 10 Drawing Sheets

U.S. PATENT DOCUMENTS

| | | |
|---|---|---|
| 4,570,848 A | 2/1986 | McLellan |
| 4,572,238 A | 2/1986 | Stenlund |
| 4,575,262 A | 3/1986 | Andersen |
| 4,580,544 A | 4/1986 | Walker |
| 4,581,707 A | 4/1986 | Millar |
| 4,604,764 A | 8/1986 | Enzo |
| 4,618,091 A | 10/1986 | Buzzi |
| 4,630,940 A | 12/1986 | Ostertag et al. |
| 4,635,844 A | 1/1987 | Barrett, Sr. et al. |
| 4,645,489 A | 2/1987 | Krumme et al. |
| 4,674,678 A | 6/1987 | Knebel et al. |
| 4,682,626 A | 7/1987 | Bergmann |
| 4,682,728 A | 7/1987 | Oudenhoven et al. |
| 4,693,415 A | 9/1987 | Sturm |
| 4,694,512 A | 9/1987 | Knebel et al. |
| 4,700,884 A | 10/1987 | Barrett et al. |
| 4,700,885 A | 10/1987 | Knebel |
| 4,706,703 A | 11/1987 | Takeuchi et al. |
| 4,709,728 A | 12/1987 | Ying-Chung |
| 4,711,392 A | 12/1987 | Kidouchi et al. |
| 4,713,525 A | 12/1987 | Eastep |
| 4,735,357 A | 4/1988 | Gregory et al. |
| 4,739,923 A | 4/1988 | Tsutsui et al. |
| 4,740,089 A | 4/1988 | Fiorentini |
| 4,742,456 A | 5/1988 | Kamena |
| 4,756,030 A | 7/1988 | Juliver |
| 4,757,943 A | 7/1988 | Sperling et al. |
| 4,762,273 A | 8/1988 | Gregory et al. |
| 4,763,681 A | 8/1988 | Cuny et al. |
| 4,768,705 A | 9/1988 | Tsutsui et al. |
| 4,842,191 A | 6/1989 | Bergmann |
| 4,854,498 A | 8/1989 | Stayton |
| 4,854,499 A | 8/1989 | Neuman |
| 4,863,098 A | 9/1989 | Kolze et al. |
| 4,867,375 A | 9/1989 | Ueki et al. |
| 4,869,427 A | 9/1989 | Kawamoto et al. |
| 4,870,986 A | 10/1989 | Barrett et al. |
| 4,873,830 A | 10/1989 | Blattler |
| 4,875,623 A | 10/1989 | Garris |
| 4,886,207 A | 12/1989 | Lee et al. |
| 4,896,101 A | 1/1990 | Cobb |
| 4,896,658 A | 1/1990 | Yonekubo et al. |
| 4,901,915 A | 2/1990 | Sakakibara |
| 4,909,435 A | 3/1990 | Kidouchi et al. |
| 4,921,162 A | 5/1990 | Blattler |
| 4,923,116 A | 5/1990 | Homan |
| 4,924,900 A | 5/1990 | Taube, Sr. et al. |
| 4,926,897 A | 5/1990 | Perrott |
| 4,928,732 A | 5/1990 | Hu |
| 4,931,938 A | 6/1990 | Hass |
| 4,936,347 A | 6/1990 | Oracz et al. |
| 4,941,608 A | 7/1990 | Shimizu et al. |
| 4,942,739 A | 7/1990 | Uda et al. |
| 4,945,943 A | 8/1990 | Cogger |
| 4,953,236 A | 9/1990 | Lee et al. |
| 4,955,535 A | 9/1990 | Tsutsui et al. |
| 4,965,894 A | 10/1990 | Baus |
| 4,967,794 A | 11/1990 | Tsutsui et al. |
| 4,968,152 A | 11/1990 | Bergmann |
| 4,969,576 A | 11/1990 | Merrill et al. |
| 4,969,598 A | 11/1990 | Garrs |
| 4,971,106 A | 11/1990 | Tsutsui et al. |
| 4,976,460 A | 12/1990 | Newcombe et al. |
| 4,978,058 A | 12/1990 | Duncan et al. |
| 4,984,314 A | 1/1991 | Weigert |
| 4,986,470 A | 1/1991 | Yamazaki |
| 4,994,792 A | 2/1991 | Ziegler, Jr. |
| 5,032,992 A | 7/1991 | Bergmann |
| 5,033,671 A | 7/1991 | Shiba et al. |
| 5,038,420 A | 8/1991 | Chen |
| 5,050,062 A | 9/1991 | Hass |
| 5,050,641 A | 9/1991 | Shwu-Fen |
| 5,058,389 A | 10/1991 | Yasuda et al. |
| 5,058,624 A | 10/1991 | Kolze |
| 5,058,804 A | 10/1991 | Yonekubo et al. |
| 5,067,333 A | 11/1991 | Duncan et al. |
| 5,074,520 A | 12/1991 | Lee et al. |
| 5,085,399 A | 2/1992 | Tsutsui et al. |
| 5,085,948 A | 2/1992 | Tsukamoto et al. |
| 5,095,945 A | 3/1992 | Jensen |
| 5,109,347 A | 4/1992 | Quick, Jr. et al. |
| 5,111,969 A | 5/1992 | Knepler |
| 5,125,433 A | 6/1992 | DeMoss et al. |
| 5,139,044 A | 8/1992 | Otten et al. |
| 5,148,824 A | 9/1992 | Wilson et al. |
| 5,170,361 A | 12/1992 | Reed |
| 5,170,514 A | 12/1992 | Weigert |
| 5,171,429 A | 12/1992 | Yasuo |
| 5,174,495 A | 12/1992 | Eichholz et al. |
| 5,184,642 A | 2/1993 | Powell |
| 5,197,508 A | 3/1993 | Gottling et al. |
| 5,199,790 A | 4/1993 | Pawelzik et al. |
| 5,206,963 A | 5/1993 | Wiens |
| 5,215,251 A | 6/1993 | Volk, Jr. et al. |
| 5,224,509 A | 7/1993 | Tanaka et al. |
| 5,240,028 A | 8/1993 | Hoch, Jr. et al. |
| 5,255,844 A | 10/1993 | Miller et al. |
| 5,261,597 A | 11/1993 | Perlman et al. |
| 5,273,208 A | 12/1993 | Herrick |
| 5,287,570 A | 2/1994 | Peterson et al. |
| 5,294,045 A | 3/1994 | Harris |
| 5,294,051 A | 3/1994 | Piegari |
| 5,295,274 A | 3/1994 | Daniels et al. |
| 5,299,775 A | 4/1994 | Kolze |
| 5,303,731 A | 4/1994 | Vavra et al. |
| 5,322,086 A | 6/1994 | Sullivan |
| 5,329,949 A | 7/1994 | Moncourtois et al. |
| 5,339,859 A | 8/1994 | Bowman |
| 5,348,223 A | 9/1994 | Sonesson et al. |
| 5,350,112 A | 9/1994 | Stein |
| 5,358,177 A | 10/1994 | Cashmore |
| 5,358,213 A | 10/1994 | Pilolla |
| 5,361,215 A | 11/1994 | Tompkins et al. |
| 5,400,961 A | 3/1995 | Tsutsui et al. |
| 5,411,241 A | 5/1995 | Nilsson et al. |
| 5,417,404 A | 5/1995 | Varden |
| 5,428,850 A | 7/1995 | Hiraishi et al. |
| RE35,018 E | 8/1995 | Homan |
| 5,452,740 A | 9/1995 | Bowman |
| 5,459,890 A | 10/1995 | Jarocki |
| 5,462,224 A | 10/1995 | Enoki et al. |
| 5,494,077 A | 2/1996 | Enoki et al. |
| 5,504,950 A | 4/1996 | Natalizia et al. |
| 5,506,391 A | 4/1996 | Burayez et al. |
| 5,511,723 A | 4/1996 | Eki et al. |
| 5,518,311 A | 5/1996 | Althaus et al. |
| 5,550,753 A | 8/1996 | Tompkins et al. |
| 5,551,630 A | 9/1996 | Enoki et al. |
| 5,564,462 A | 10/1996 | Storch |
| 5,577,660 A | 11/1996 | Hansen |
| 5,588,636 A | 12/1996 | Eichholz et al. |
| 5,598,973 A | 2/1997 | Weston |
| 5,694,653 A | 12/1997 | Harald |
| 5,755,262 A | 5/1998 | Pilolla |
| 5,779,139 A | 7/1998 | Ueno |
| 5,810,474 A | 9/1998 | Hidalgo |
| 5,829,072 A | 11/1998 | Hirsch et al. |
| 5,845,844 A | 12/1998 | Zosimodis |
| 5,855,356 A | 1/1999 | Fait |
| 5,860,596 A | 1/1999 | Kolt |
| 5,873,518 A | 2/1999 | Richmond et al. |
| 5,889,684 A | 3/1999 | Ben-David et al. |
| 5,904,292 A | 5/1999 | McIntosh |
| 5,927,332 A | 7/1999 | Richard |

| | | | | | |
|---|---|---|---|---|---|
| 5,931,374 A | 8/1999 | Knapp | 6,464,210 B1 | 10/2002 | Teran et al. |
| 5,941,635 A | 8/1999 | Stewart | 6,473,917 B1 | 11/2002 | Mateina |
| 5,966,753 A | 10/1999 | Gauthier et al. | 6,478,285 B1 | 11/2002 | Bergmann |
| 5,970,528 A | 10/1999 | Shirai et al. | 6,481,029 B1 | 11/2002 | Mateina |
| 5,975,124 A | 11/1999 | Stevens, II | 6,481,634 B1 | 11/2002 | Zosimadis |
| 5,979,775 A | 11/1999 | Raya | 6,497,372 B2 | 12/2002 | Lee et al. |
| 5,979,776 A | 11/1999 | Williams | 6,513,787 B1 | 2/2003 | Jeromson et al. |
| 6,003,182 A | 12/1999 | Song | 6,517,006 B1 | 2/2003 | Knapp |
| 6,024,290 A | 2/2000 | Dosani et al. | 6,543,478 B2 | 4/2003 | Kline |
| 6,029,094 A | 2/2000 | Diffut | 6,549,816 B2 | 4/2003 | Gauthier et al. |
| 6,044,857 A | 4/2000 | Stege | 6,554,196 B2 | 4/2003 | Sasayama et al. |
| 6,050,296 A | 4/2000 | Hoffmann et al. | 6,557,785 B1 | 5/2003 | Knapp |
| 6,059,192 A | 5/2000 | Zosimadis | 6,601,986 B2 | 8/2003 | Jang et al. |
| 6,079,625 A | 6/2000 | Lebkuchner | 6,619,320 B2 | 9/2003 | Parsons |
| 6,097,993 A | 8/2000 | Skupin et al. | 6,629,645 B2 | 10/2003 | Mountford et al. |
| 6,123,094 A | 9/2000 | Breda | 6,637,668 B2 | 10/2003 | Eveleigh |
| 6,132,085 A | 10/2000 | Bergeron | 6,641,727 B1 | 11/2003 | Aldred et al. |
| 6,168,949 B1 | 1/2001 | Rubenberger | 6,655,829 B1 | 12/2003 | Vanden Bussche et al. |
| 6,195,588 B1 | 2/2001 | Gauthier et al. | 6,659,361 B2 | 12/2003 | Sasayama et al. |
| 6,199,587 B1 | 3/2001 | Shlomi et al. | 6,669,843 B2 | 12/2003 | Arnaud |
| 6,219,859 B1 | 4/2001 | Derakhshan | 6,676,024 B1 | 1/2004 | McNerney et al. |
| 6,234,670 B1 | 5/2001 | Bergeron | 6,679,476 B2 | 1/2004 | Noyes et al. |
| 6,237,853 B1 | 5/2001 | Bergmann | 6,691,338 B2 | 2/2004 | Zieger |
| 6,239,708 B1 | 5/2001 | Young | 6,701,194 B2 | 3/2004 | Gauthier et al. |
| 6,241,379 B1 | 6/2001 | Larsen | 6,705,534 B1 | 3/2004 | Mueller |
| 6,250,558 B1 | 6/2001 | Dogre Cuevas | 6,708,895 B1 | 3/2004 | Knapp |
| 6,250,601 B1 | 6/2001 | Touch et al. | 6,713,036 B1 | 3/2004 | Vanden Bussche et al. |
| 6,253,624 B1 | 7/2001 | Broden et al. | 6,715,731 B1 | 4/2004 | Post et al. |
| 6,264,121 B1 | 7/2001 | McClary | 6,722,575 B1 | 4/2004 | Gagne et al. |
| 6,270,014 B1 | 8/2001 | Bollas et al. | 6,769,252 B2 | 8/2004 | Smith |
| 6,273,394 B1 | 8/2001 | Vincent et al. | 6,776,395 B1 | 8/2004 | Meier |
| 6,279,777 B1 | 8/2001 | Goodin | 6,805,330 B2 | 10/2004 | Bush |
| 6,286,464 B1 | 9/2001 | Abraham et al. | 6,811,713 B2 | 11/2004 | Arnaud |
| 6,286,764 B1 | 9/2001 | Garvey et al. | 6,820,816 B1 | 11/2004 | Reid |
| 6,290,139 B1 | 9/2001 | Kolze | 6,823,892 B1 | 11/2004 | Knapp |
| 6,294,786 B1 | 9/2001 | Marcichow et al. | 6,826,455 B1 | 11/2004 | Iott et al. |
| 6,305,610 B1 | 10/2001 | Estes | 6,854,658 B1 | 2/2005 | Houghton et al. |
| 6,305,663 B1 | 10/2001 | Miller | 7,175,099 B2 | 2/2007 | Bilyard et al. |
| 6,315,208 B1 | 11/2001 | Doyle | 2001/0020645 A1 | 9/2001 | Mountford et al. |
| 6,317,717 B1 | 11/2001 | Lindsey et al. | 2001/0044954 A1 | 11/2001 | DiCarlo |
| 6,321,785 B1 | 11/2001 | Bergmann | 2002/0020179 A1 | 2/2002 | Winkler |
| 6,336,233 B1 | 1/2002 | Shaw et al. | 2002/0029416 A1 | 3/2002 | Shaw et al. |
| 6,340,032 B1 | 1/2002 | Zosimadis | 2002/0148040 A1 | 10/2002 | Mateina |
| 6,352,106 B1 | 3/2002 | Hartman | 2002/0179723 A1 | 12/2002 | Wack et al. |
| 6,363,549 B2 | 4/2002 | Humpert | 2003/0052007 A1 | 3/2003 | Paul et al. |
| 6,378,545 B1 | 4/2002 | Bozkan et al. | 2003/0075611 A1 | 4/2003 | Eveleigh |
| 6,382,252 B1 | 5/2002 | Moore et al. | 2003/0080194 A1 | 5/2003 | O'Hara et al. |
| 6,390,125 B2 | 5/2002 | Pawelzik et al. | 2003/0088338 A1 | 5/2003 | Phillips et al. |
| 6,394,361 B1 | 5/2002 | Fridmann et al. | 2003/0125842 A1 | 7/2003 | Chang et al. |
| 6,405,932 B1 | 6/2002 | Palmer | 2003/0126993 A1 | 7/2003 | Lassota et al. |
| 6,408,881 B2 | 6/2002 | Lorenzelli et al. | 2003/0218074 A1 | 11/2003 | Beck et al. |
| 6,435,213 B2 | 8/2002 | Lou | 2004/0000594 A1 | 1/2004 | Beck et al. |
| 6,438,770 B1 | 8/2002 | Hed et al. | 2004/0041033 A1 | 3/2004 | Kemp |
| 6,445,880 B1 | 9/2002 | Hollander et al. | 2004/0041034 A1 | 3/2004 | Kemp |
| 6,446,875 B1 | 9/2002 | Brooks et al. | 2004/0134545 A1 | 7/2004 | Ford |
| RE37,888 E | 10/2002 | Cretu-Petra | 2004/0193326 A1 | 9/2004 | Phillips et al. |
| 6,463,999 B1 | 10/2002 | Jung | 2007/0057215 A1 | 3/2007 | Parsons et al. |

FLUID MIXER

BACKGROUND AND SUMMARY OF THE INVENTION

The present invention relates to a fluid delivery system and, more particularly, to an apparatus and method for mixing fluids.

Systems for mixing cold water and hot water in a manner providing for a mixed water of a desired temperature are well known in the art. One prior art system includes a two-handle faucet having a cold water control valve and a hot water control valve configured to supply cold water and hot water at a mixing chamber, typically a "T" connection. Such a mixing chamber usually causes the cold water and the hot water to flow against each other since they are supplied in substantially opposite directions. The opposing flows of the cold water and the hot water cause a back pressure, or pressure drop, to develop at the mixing point. Back pressure is proportional to the water flow and results in reduced water flow through the system. As such, back pressure results in a lower flow rate of mixed water.

Further, conventional mixing chambers often do not provide for efficient mixing of the cold water and the hot water, resulting in mixed water having stratified hot and cold portions. Complete mixing of the cold water and the hot water into mixed water with no significant temperature stratification usually only occurs after an extended run of water through the outlet piping.

According to an illustrative embodiment of the present invention, a fluid mixer includes a housing defining a mixing chamber, a cold water inlet in fluid communication with the mixing chamber and configured to supply a combined cold water stream to the mixing chamber, and a hot water inlet in fluid communication with the mixing chamber and configured to supply a combined hot water stream to the mixing chamber. A mixed water outlet is in fluid communication with the housing and is configured to receive a combined mixed water stream from the housing. A mixing element is received within the housing, and at least one directing member is operably coupled to the mixing element and defines a cold water pathway and a hot water pathway in spaced relation to the cold water pathway. The cold water pathway directs the combined cold water stream from the cold water inlet to the mixing element. Likewise, the hot water pathway directs the combined hot water stream from the hot water inlet to the mixing element. The mixing element is configured to separate the combined cold water stream into a plurality of spaced apart component cold water streams, to separate the combined hot water stream into a plurality of spaced apart component hot water streams, and to mix the component cold water streams and the component hot water streams into a plurality of spaced apart component mixed water streams. The mixing element is further configured to combine the plurality of component mixed water streams into a combined mixed water stream provided to the mixed water outlet.

According to a further illustrative embodiment of the present invention, a method of mixing a hot water stream and a cold water stream to produce a mixed water stream is provided. The method includes the steps of providing a combined cold water stream, and providing a combined hot water stream. The method further includes the steps of separating the combined cold water stream into a plurality of spaced apart component cold water streams, and separating the combined hot water stream into a plurality of spaced apart component hot water streams. The method further includes the step of mixing the component cold water streams with the component hot water streams to form a plurality of separated component mixed water streams. The method also includes the step of combining the plurality of component mixed water streams into a combined mixed water stream.

According to yet another illustrative embodiment of the present invention, a fluid mixing element includes a longitudinally extending outer wall, a plurality of cold water separating ports defined within the outer wall, and a plurality of hot water separating ports defined within the outer wall. A plurality of longitudinally extending combination channels are provided, wherein each combination channel is in fluid communication with at least one of the cold water separating ports and at least one of the hot water separating ports.

According to a further illustrative embodiment of the present invention, a fluid mixer includes a cold water inlet configured to supply cold water, and a hot water inlet configured to supply hot water. A mixing element is in fluid communication with the cold water inlet to receive the cold water and is in fluid communication with the hot water inlet to receive the hot water. The mixing element is configured to combine the cold water and the hot water to produce a mixed water. An outlet is in fluid communication with the mixing element, the outlet including an outer tubular member and an inner tubular member concentrically received within the outer tubular member. The outer tubular member includes a discharge end operably coupled to a first fluid delivery device. The inner tubular member includes an open inlet end and a discharge end operably coupled to a second fluid delivery device. The mixed water is configured to flow in a first direction from the mixing element to the discharge end of the outer tubular member, and in a second direction opposite the first direction from the inlet end of the inner tubular member to the discharge end of the inner tubular member. A temperature sensor is positioned within the outer tubular member proximate the inlet end of the inner tubular member to sense the temperature of the mixed water flowing through either the outer tubular member to the first fluid delivery device or the inner tubular member to the second fluid delivery device.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 4:
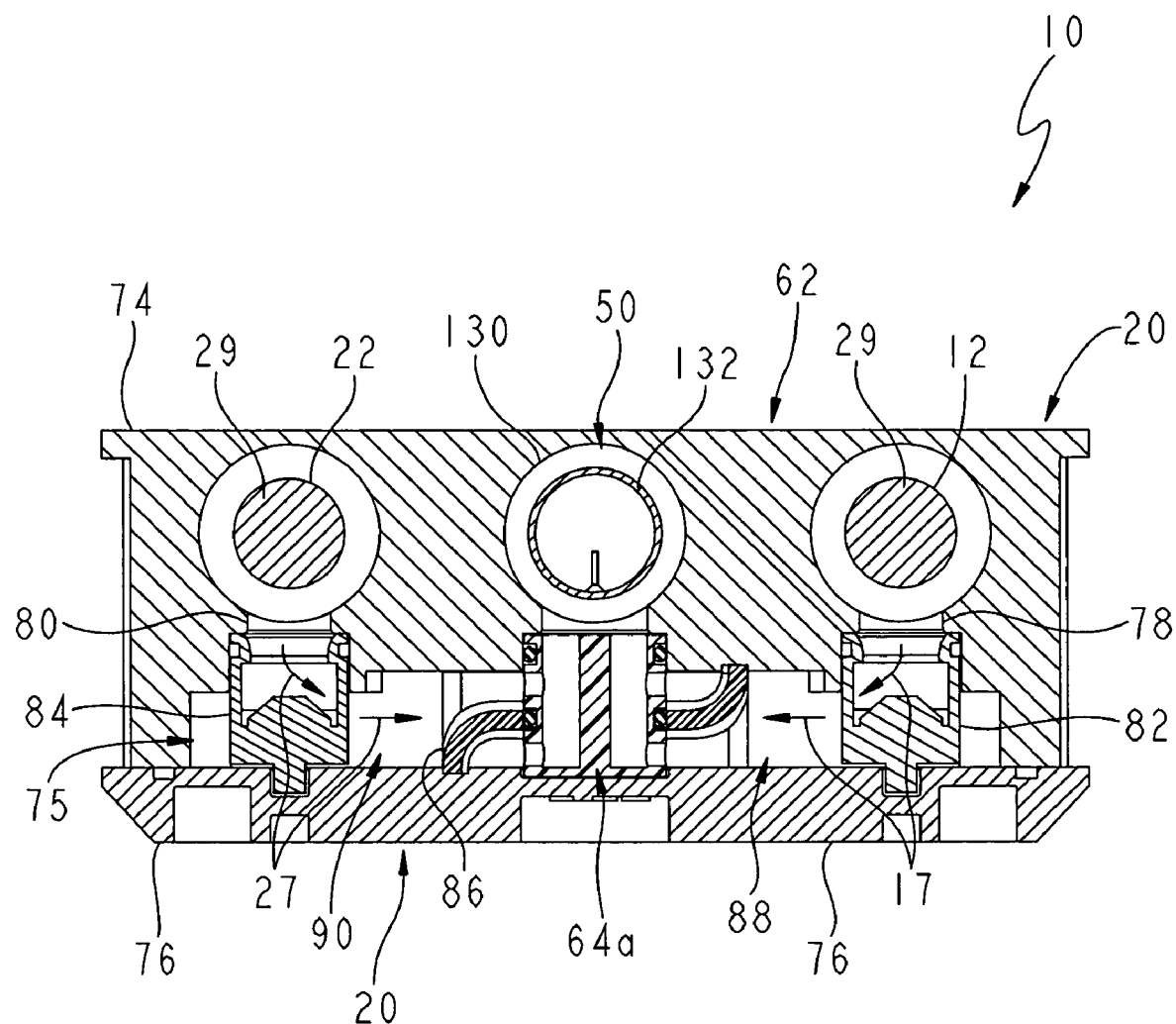
FIG. 4 is a cross-sectional view taken along line 4-4 of FIG. 3.
Figure 5:
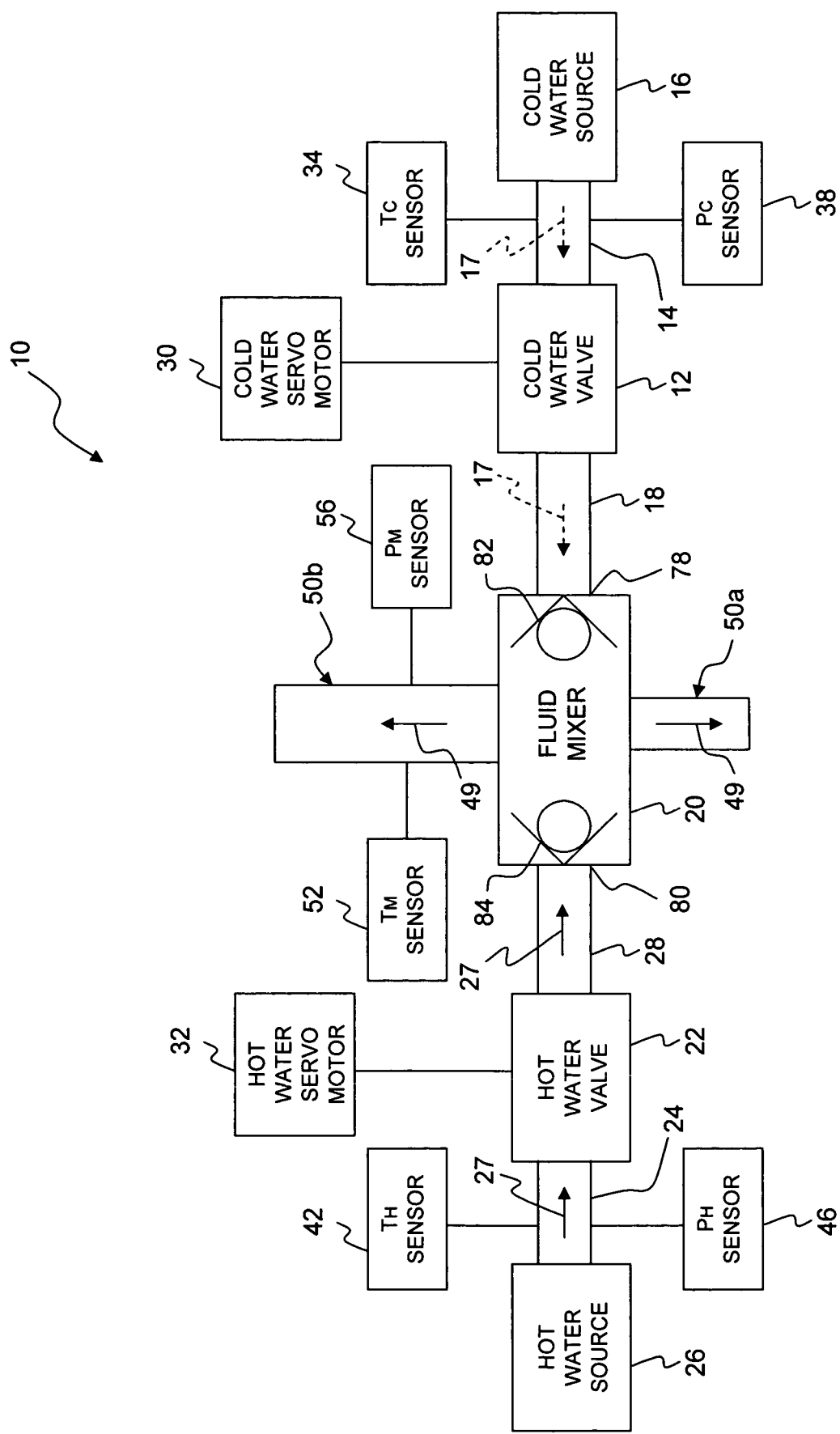
FIG. 5 is a block diagram of the fluid delivery system of FIG. 1.

Referring initially to FIGS. 1-5, the water delivery system 10 of the illustrative embodiment includes a cold water valve 12 having an inlet 14 configured to be coupled to a cold water source 16 for receiving a combined cold water stream 17 (FIG. 5). An outlet 18 of the cold water valve 12 is in fluid communication with a fluid mixer 20. Similarly, a hot water valve 22 has an inlet 24 configured to be coupled to a hot water source 26 for receiving a combined hot water stream 27 (FIG. 5). An outlet 28 of the hot water valve 22 is in fluid communication with the fluid mixer 20.

Figure 6:
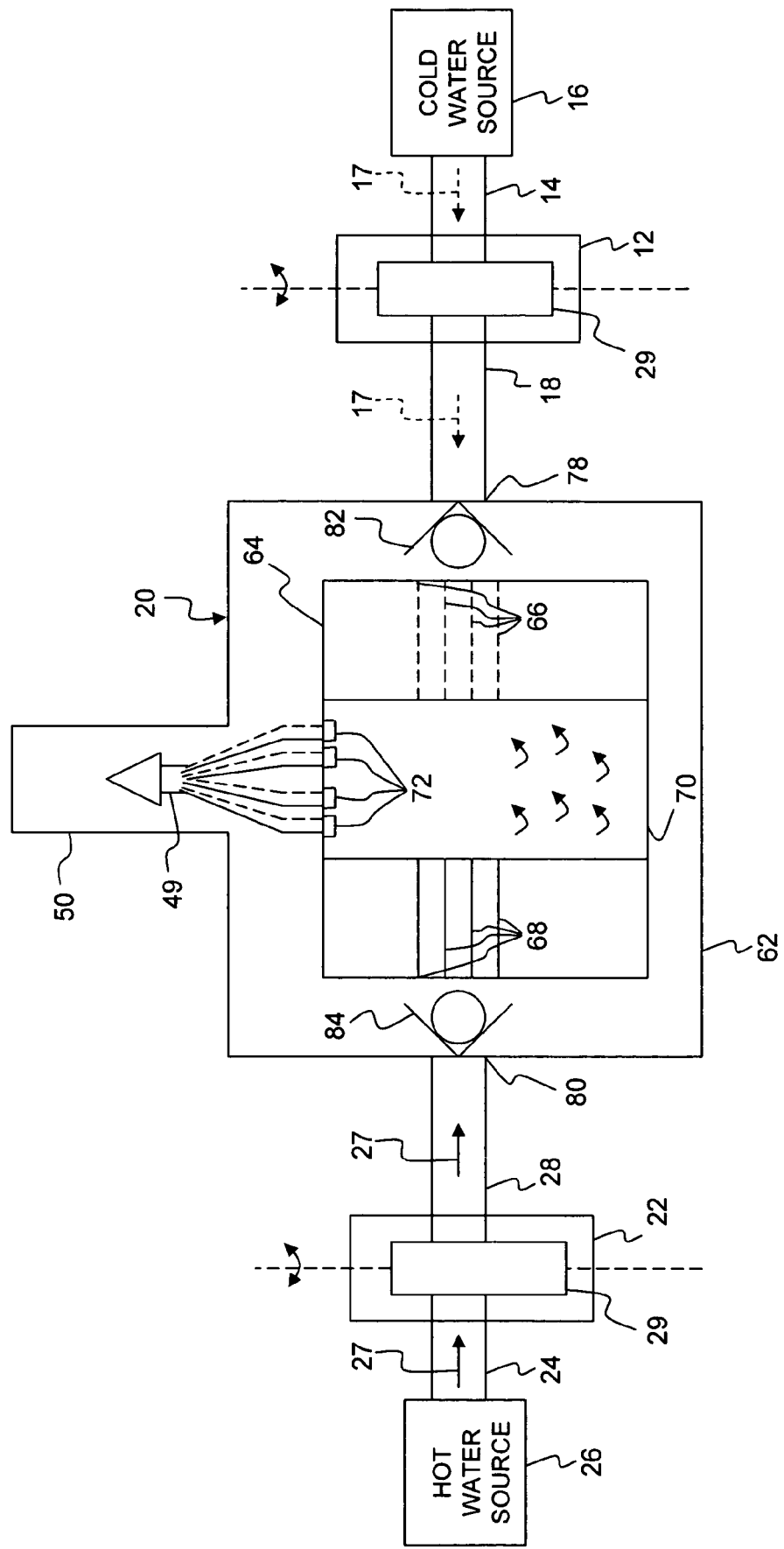
FIG. 6 is a schematic representation of the fluid mixer of FIG. 1.
Figure 7:
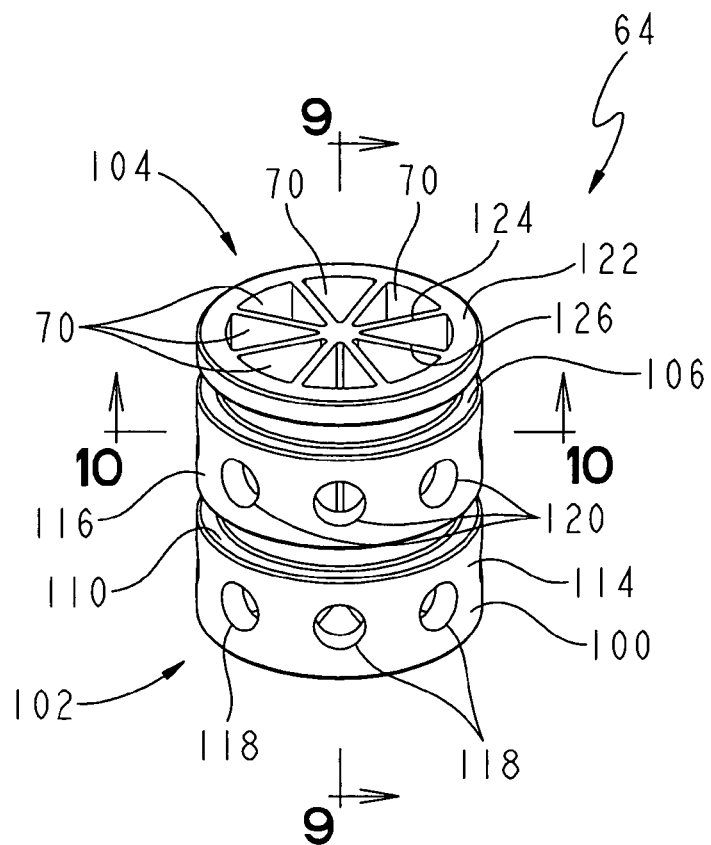
FIG. 7 is a bottom perspective view of an illustrative embodiment mixing element of the present invention.
Figure 8:
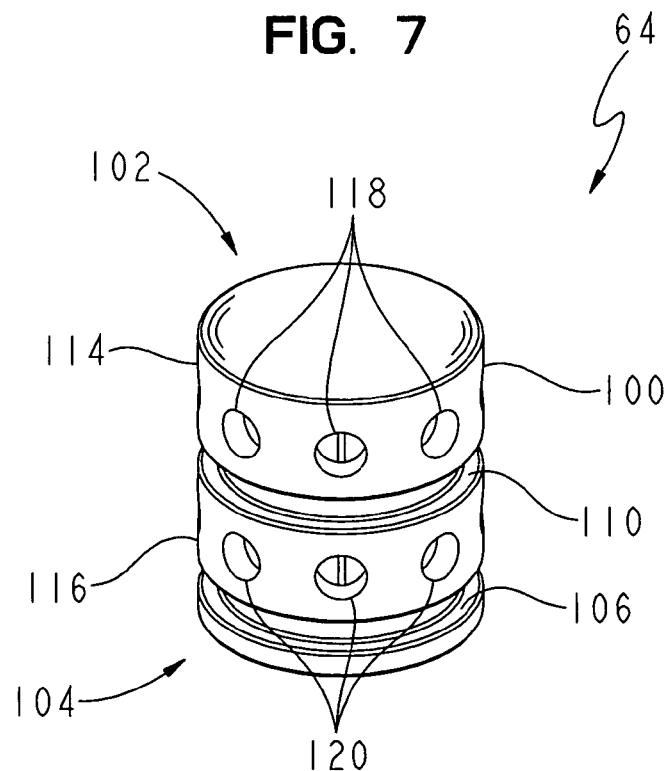
FIG. 8 is a top perspective view of the mixing element of FIG. 7.

With reference to FIGS. 4 and 6, both the cold water valve 12 and the hot water valve 22 may be of conventional design and illustratively include a rotatable valving member 29, wherein rotation of the valving member 29 increases or decreases the rate of water flow through the respective valve 12, 22. Illustratively, the valving members 29 are of a low torque ceramic disk variety that require reduced energy to operate and are field replaceable. In the illustrative embodiment, the cold water valve 12 and the hot water valve 22 each comprise Model No. F 120 available from Fluehs Corporation of Germany. It should be appreciated that other suitable valves may be readily substituted therefor.

With further reference to FIG. 5, a cold water servo motor 30 is operably coupled to the cold water valve 12, while a hot water servo motor 32 is operably coupled to the hot water valve 22. More particularly, the cold water servo motor 30 and the hot water servo motor 32 are each coupled to the respective rotatable valving member 29 of the cold water valve 12 and the hot water valve 22. As such, operation of the servo motor 30 adjusts the flow of the combined cold water stream 17 through the cold water valve 12, and operation of the servo motor 32 adjusts the flow of the combined hot water stream 27 through the hot water valve 22. Each servo motor 30, 32 may be of conventional design and illustratively comprise Model No. HS 5475 HB available from Hitec RCD USA, Inc. of Poway, Calif. While servo motors 30, 32 are utilized in the illustrative embodiment, it should be appreciated that other suitable actuators, such as DC motors, may be substituted therefor.

In the illustrative embodiment, a cold water temperature sensor 34 is operably coupled to the inlet 14 of the cold water valve 12 and is configured to measure a temperature ($T_C$) of the combined cold water stream 17 flowing therethrough. Similarly, a cold water pressure sensor 38 is operably coupled to the inlet 14 of the cold water valve 12 and is configured to measure a pressure ($P_C$) of the combined cold water stream 17 therein. A hot water temperature sensor 42 is operably coupled to the inlet 24 of the hot water valve 22 and is configured to measure a temperature ($T_H$) of the combined hot water stream 27 flowing into the hot water valve 22. Similarly, a hot water pressure sensor 46 is operably coupled to the inlet 24 of the hot water valve 22 and is configured to measure a pressure ($P_H$) of the combined hot water stream 27 contained therein.

As further detailed herein, the mixer 20 receives the combined cold water stream 17 from the outlet 18 of the cold water valve 12 and the combined hot water stream 27 from the outlet 28 of the hot water valve 22, and forms a combined mixed water stream 49 which is then discharged through a mixed water outlet 50. A mixed water temperature sensor 52 is operably coupled to the mixed water outlet 50 and is configured to measure the temperature ($T_M$) of the combined mixed water stream 49 flowing therethrough. A mixed water pressure sensor 56 is operably coupled to the mixed water outlet 50 and is configured to measure the pressure ($P_M$) of the combined mixed water stream 49 contained therein.

The cold water temperature sensor 34, the cold water pressure sensor 38, the hot water temperature sensor 42, the hot water pressure sensor 46, the mixed water temperature sensor 52, and the mixed water pressure sensor 56 are all operably coupled to a controller (not shown). The controller illustratively receives signals from the sensors 34, 38, 42, 46, 52, and 56, and in response thereto controls operation of the cold water servo motor 30 to adjust the flow of the combined cold water stream 17 through the cold water valve 12 and controls operation of the hot water servo motor 32 to adjust the flow of the combined hot water stream 27 through the hot water valve 22. Additional details of an illustrative embodiment control system for use in connection with the mixer 20 of the present invention are detailed in U.S. patent application Ser. No. 11/109,281, entitled "Electronic Proportioning Valve" filed concurrently herewith, which is assigned to the assignee of the present invention and is expressly hereby incorporated by reference.

Figure 10:
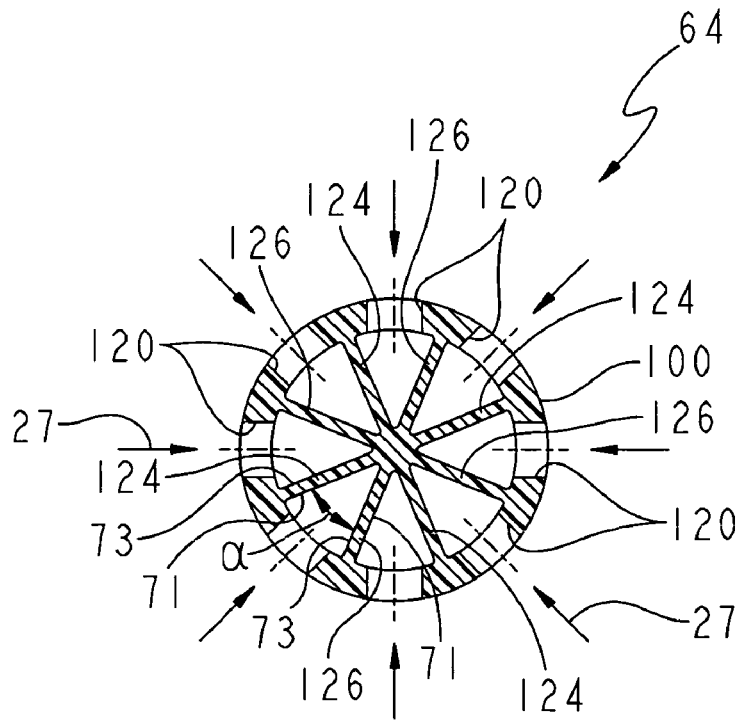
FIG. 10 is a cross-sectional view taken along line 10-10 of FIG. 7.

With further reference to FIG. 6, the mixer 20 is schematically illustrated as including a housing 62 configured to receive the combined cold water stream 17 and the combined hot water stream 27. The mixer 20 illustratively includes a pair of mixing elements 64a and 64b (FIGS. 1 and 3), which separate the combined cold water stream 17 into a plurality of spaced apart component cold water streams 66 and separate the combined hot water stream 27 into a plurality of spaced apart component hot water streams 68. Within each mixing element 64, a plurality of combination channels 70 turbulently mixes each component cold water stream 66 with a corresponding component hot water stream 68, thereby forming a plurality of spaced apart component mixed water streams 72. As detailed herein, each channel 70 is shaped to cause impingement of cold water stream 66 and hot water stream 68 on inwardly facing angled surfaces 71 and 73 (FIG. 10).

The component mixed water streams 72 are then joined together to form a single combined mixed water stream 49 which is supplied to the mixed water outlet 50. While the illustrative embodiment shows two mixing elements 64a and 64b, it should be appreciated that this does not limit the invention and that any number of mixing elements 64 may be substituted therefor. More particularly, the number and dimensions of the mixing elements 64 may vary depending upon the desired flow rate of water through the mixer 20. As such, the number and dimensions of mixing elements 64 may vary depending upon the cross-sectional area of the upstream water flow channels, including the inlets 14 and 24 and outlets 18 and 28. Further, in the following description of the illustrative embodiment mixer 20, it should be noted that mixing element 64a is substantially identical to mixing element 64b.

Figure 1:
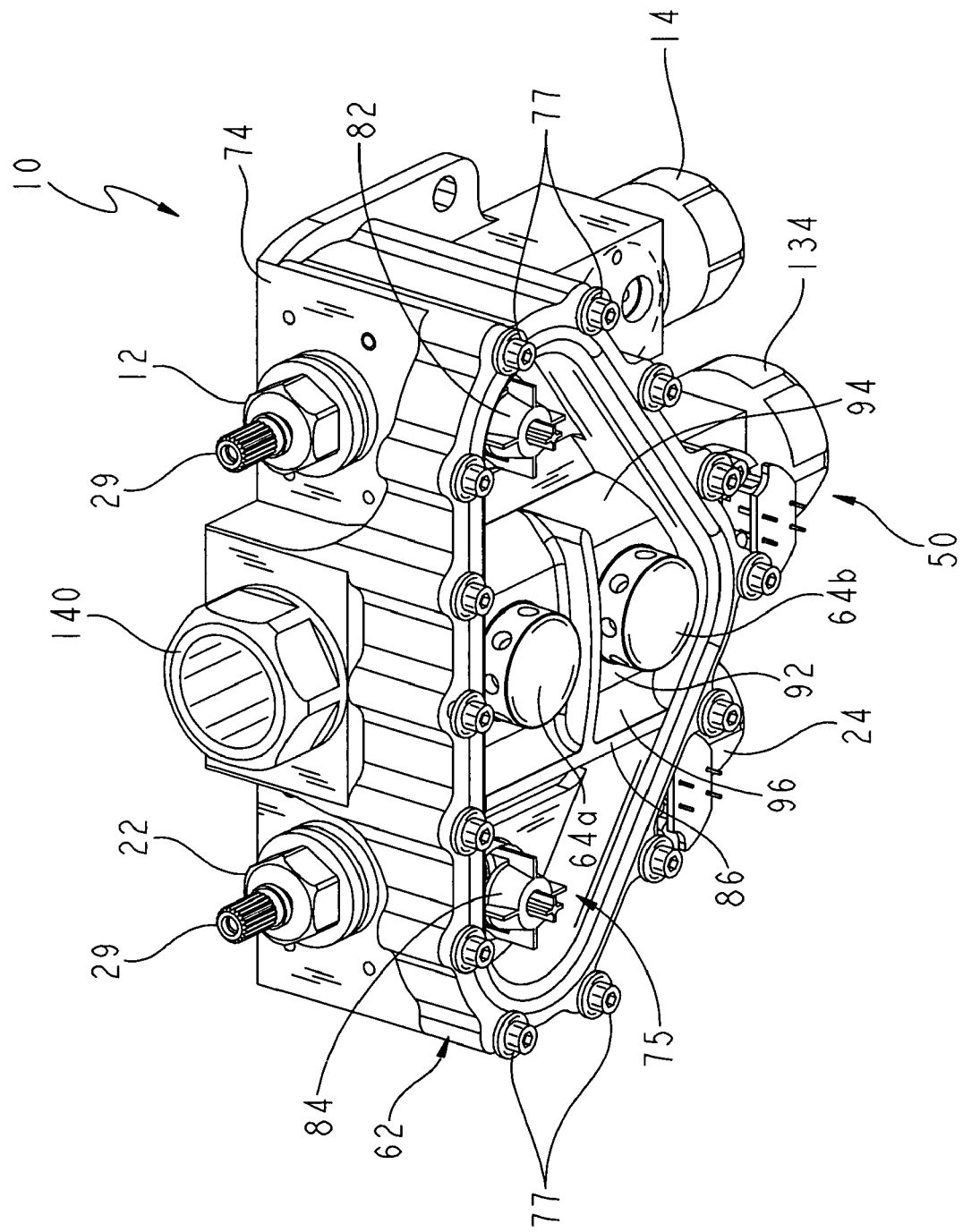
FIG. 1 is a perspective view of a fluid delivery system incorporating an illustrative embodiment fluid mixer, with the servo motors and the housing cover removed to show the mixing elements and the directing members, and with the input sensors shown in phantom.
Figure 2:
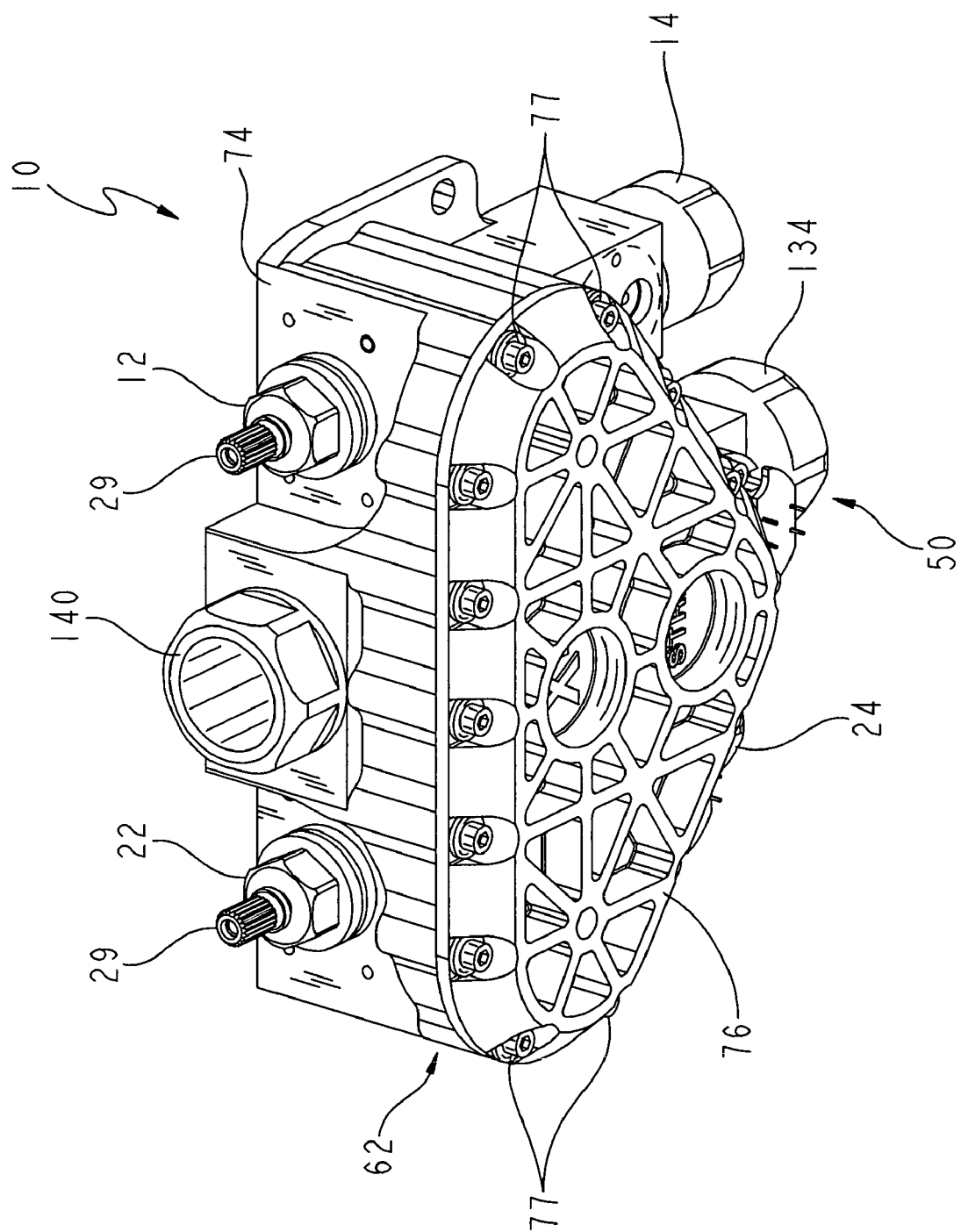
FIG. 2 is a perspective view similar to FIG. 1, with the housing cover coupled to the base.
Figure 3:
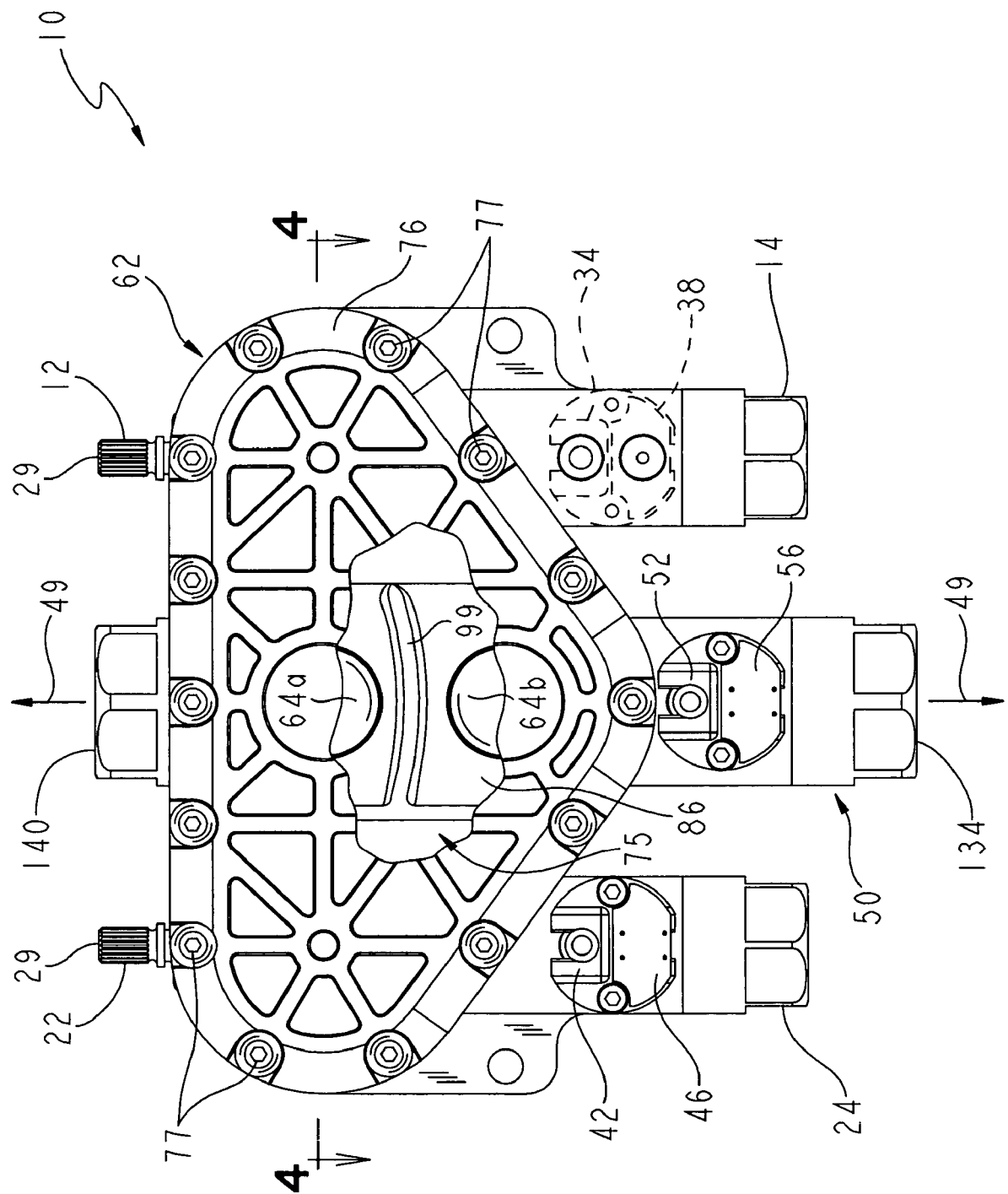
FIG. 3 is a front elevational view of the fluid delivery system of FIG. 2 with a partial cut-away of the housing cover to show the mixing elements and the directing member.

Referring further to FIGS. 1 and 2, the housing 62 includes a base 74 and a cover 76 defining an mixing chamber 75.

Illustratively, the base 74 and the cover 76 are formed of a durable material, such as brass. The cover 76 may be secured to the base 74 through conventional fasteners, illustratively bolts 77. The base 74 illustratively includes a cold water inlet 78 in fluid communication with the outlet 18 of the cold water valve 12, and a hot water inlet 80 in fluid communication with the outlet 28 of the hot water valve 22. A cold water check valve 82 and a hot water check valve 84 are illustratively operably coupled with the cold water inlet 78 and the hot water inlet 80, respectively (FIG. 4). The check valves 82 and 84 are configured to prevent the back flow of the combined cold water stream 17 and the combined hot water stream 27 from the mixing chamber 75 to the inlet 78 and the inlet 80, respectively, in cases of reduced pressure on either inlet 78 or 80.

With reference to FIGS. 1, 3, 4, and 11, a directing member 86 is supported within the housing 62 and defines a cold water pathway 88 from the cold water inlet 78 to the mixing elements 64. The directing member 86 further defines a hot water pathway 90 from the hot water inlet 80 to the mixing elements 64. More particularly, the directing member 86 cooperates with the mixing elements 64 to maintain separation between the combined cold water stream 17 and the combined hot water stream 27 within the mixing chamber 75 from the inlets 78 and 80 to the mixing elements 64.

Figure 11:
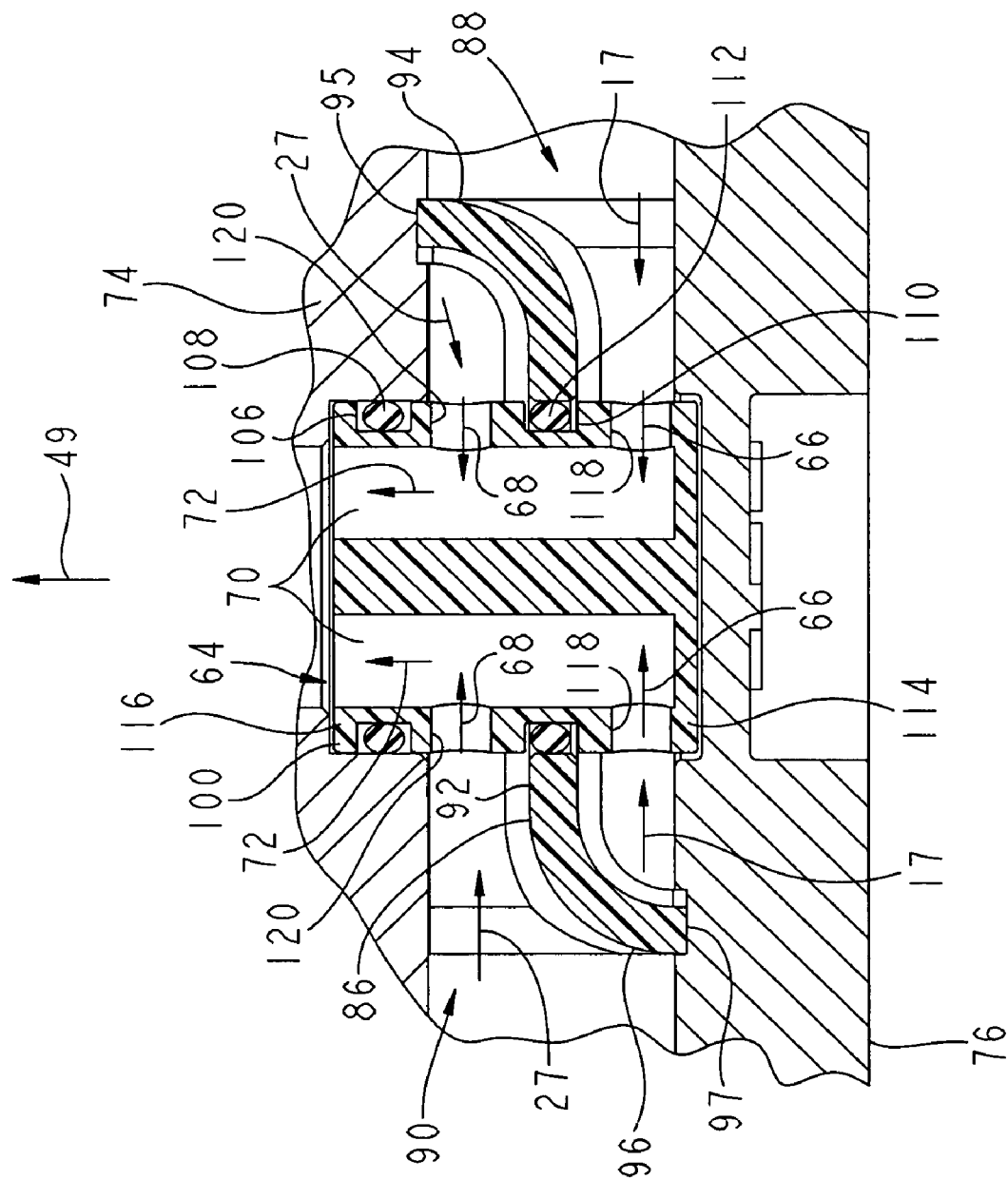
FIG. 11 is a cross-sectional view detailing the relationship between the directing member, the mixing element, and the housing of the illustrative embodiment fluid mixer of the present invention.

The directing member 86 illustratively includes a substantially planar center portion 92, an arcuate first end portion 94, and an arcuate second end portion 96. The center portion 92 includes a pair of openings 98 which are operably coupled to the mixing elements 64. The number and dimensions of the openings may vary depending upon the number of mixing elements 64 utilized as detailed above. The arcuate first end portion 94 extends from the center portion 92 to sealingly engage the base 74, while the arcuate second end portion 96 extends from the center portion 92 in an opposite direction to sealingly engage the cover 76. More particularly, the first end portion 94 is illustratively received within a groove 95 formed within the base 74, and the second end portion 96 is illustratively received within a groove 97 formed within the cover 76 (FIG. 11). Conventional gaskets (not shown) may be received within the grooves 95 and 97, as desired to assist in sealing. The directing member 86 may also include a separating wall 99 (FIG. 3) extending intermediate the mixing elements 64a and 64b to separate flow of the combined cold water stream 17 and the combined hot water stream 27 between the two mixing elements 64a and 64b. In the illustrative embodiment, the directing member 86 is molded from a thermoplastic material. However, it should be appreciated that other suitable materials may be substituted therefor. Additionally, it should be noted that in alternative embodiments the directing member 86 may be formed integral with the housing 62 and/or the mixing elements 64, or may be formed of multiple independent components.

Referring now to FIGS. 7-11, each mixing element 64 includes a cylindrical outer wall 100 extending axially between a closed end 102 and an open discharge end 104. A first groove 106 is formed within the outer wall 100 and is configured to receive an o-ring 108 to facilitate sealing between the mixing element 64 and the base 74 of the housing 62. A second groove 110 is likewise formed within the outer wall 100 and is configured to receive an o-ring 112 to facilitate sealing between the mixing element 64 and the center portion 92 of the directing member 86 (FIG. 11). The mixing element 64 includes a first portion 114 and a second portion 116, which is separated from the first portion 114 by the directing member 86. The first portion 114 includes a plurality of radially extending cold water separating ports 118 circumferentially disposed in equal spaced relation around the outer wall 100. Similarly, the second portion 116 includes a plurality of radially extending hot water separating ports 120 circumferentially disposed in equal spaced relation around the outer wall 100. The cold water separating ports 118 are disposed in axially spaced relation to the hot water separating ports 120 on opposite sides of the directing member 86. Illustratively, the cold water separating parts 118 are disposed in a first plane, while the hot water separating ports 120 are disposed in a second plane, which is substantially parallel to the first plane.

The plurality of combination channels 70 extend axially within each mixing element 64. Each combination channel 70 is illustratively defined by an arcuate portion 122 of the outer wall 100, a first radially extending wall 124 and a second radially extending wall 126. In the illustrative embodiment, the arcuate portion 122, the first wall 124, and the second wall 126 together define a substantially pie-shaped cross section for each combination channel 70. As shown in FIG. 10, the first and second walls 124 and 126 define the inwardly facing angled surfaces 71 and 73. Further, in the illustrative embodiment, a total of eight combination channels 70 are formed within each mixing element 64, such that the angle α between the first wall 124 and the second wall 126 of each channel 70 is approximately 45° (FIG. 10). However, it should be appreciated that the cross-sectional shape, the number, and the dimensions of the combination channels 70 may be varied and do not limit the scope of the invention.

Figure 9:
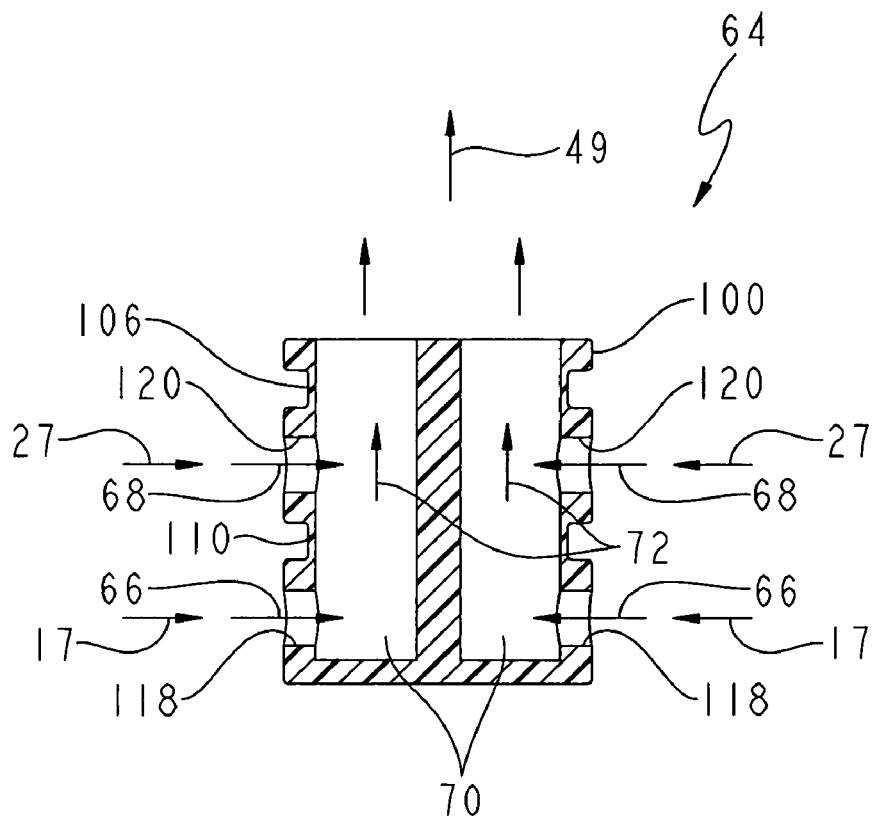
FIG. 9 is a cross-sectional view taken along line 9-9 of FIG. 7.

In the illustrative embodiment as shown in FIGS. 9 and 11, a single cold water separating port 118 and a single hot water separating port 120 are in fluid communication with a respective combination channel 70. Illustratively, there are a total of eight cold water separating ports 118 and eight hot water separating ports 120 in each mixing element 64. As such, the illustrative embodiment fluid mixer 20 includes a total of sixteen cold water separating ports 118 and sixteen hot water separating ports 120 in fluid communication with sixteen combination channels 70. Again, however, the number and arrangement of separating ports 118 and 120 may be varied and does not limit the scope of the invention.

In the illustrative embodiment, the combined cross-sectional area of the plurality of cold water separating ports 118 is at least as great as the cross-sectional area of the cold water inlet 78 in order to prevent the loss of cold water flow due to back pressure. Similarly, the combined cross-sectional area of the hot water separating ports 120 is illustratively at least as great as the combined cross-sectional area of the hot water inlet 80 in order to prevent the loss of hot water flow due to back pressure. In other words, the cold water separating ports 118 do not present a restriction to the flow of cold water therethrough, and the hot water separating ports 120 do not present a restriction to the flow of hot water therethrough. Further, in the illustrative embodiment, the cross-sectional area of each combination channel 70 is at least as great as the combined cross-sectional area of the water separating ports 118 and 120 in fluid communication with the respective channel 70, again to prevent a restriction to water flow.

In the illustrative embodiment, the mixing element 64 is molded from a thermoplastic material. However, it should be appreciated that other suitable materials may be substituted therefor.

Figure 12:
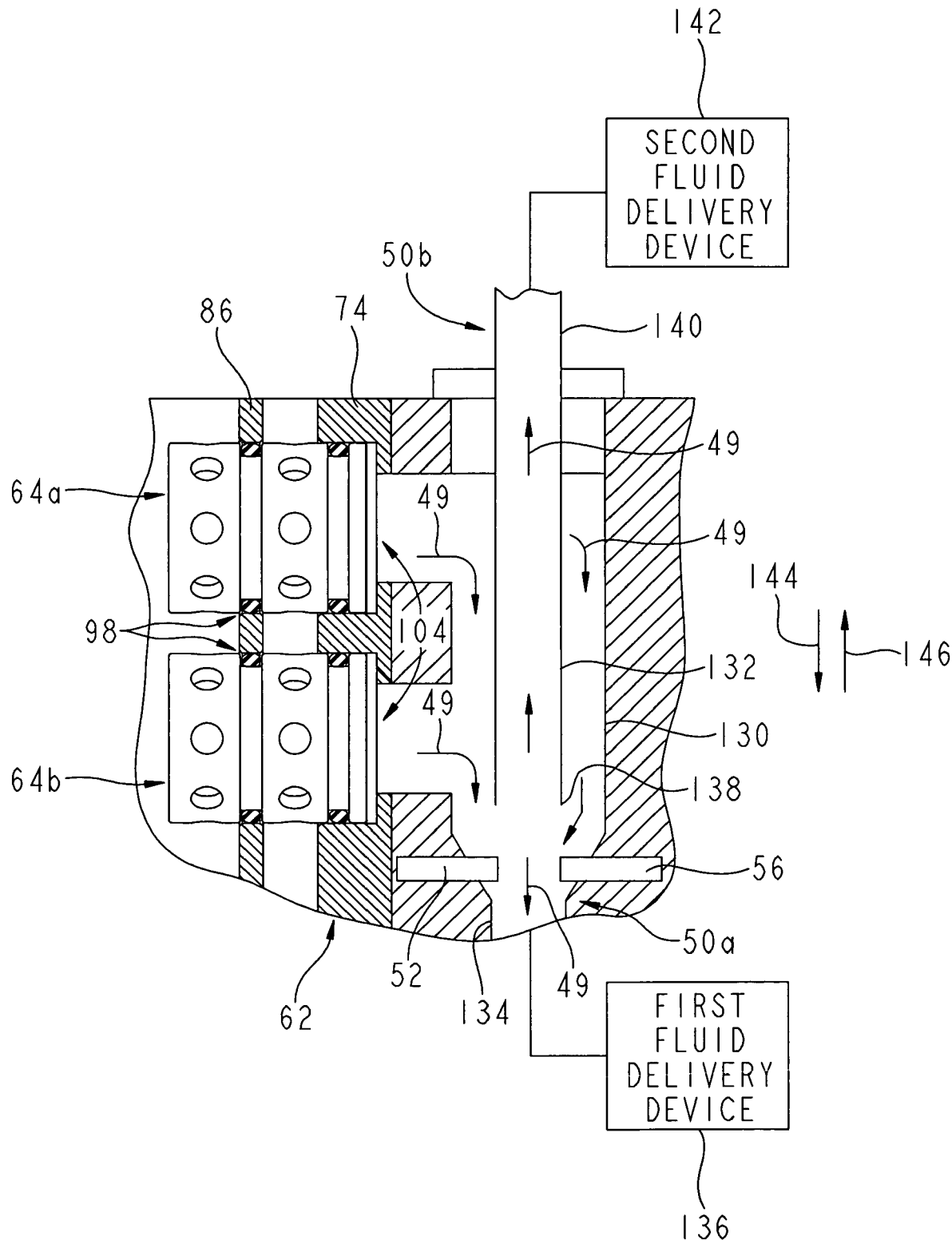
FIG. 12 is a cross-sectional view, in partial schematic, illustrating the mixed water outlet of the illustrative embodiment fluid mixer of the present invention.

Referring now to FIGS. 11 and 12, the mixed water outlet 50 is in fluid communication with the discharge ends 104 of the mixing elements 64. The mixed water outlet 50 illustratively may define a three-way system (i.e., cold water inlet 78, hot water inlet 80, and a single discharge outlet 50) or a four-way system (i.e., cold water inlet 78, hot water inlet 80, and a dual discharge outlet 50a and 50b). In the four-way system, the mixed water outlets 50a and 50b are illustratively defined by an outer tubular member 130 and an inner tubular member 132 concentrically received within the outer tubular member 130. The outer tubular member 130 includes a discharge end 134 operably coupled to a first fluid delivery device 136, illustratively a tub spout. The inner tubular member 132 includes an open inlet end 138 and a discharge end 140 operably coupled to a second fluid delivery device 142, illustratively a shower head. As shown in FIG. 12, the combined mixed water stream 49 is configured to flow in a first direction (arrow 144) from the mixing elements 64 to the first fluid delivery device 136. The combined mixed water stream 49 is also configured to flow in a second direction (arrow 146) opposite the first direction from the inlet end 138 of the inner tubular member 132 to the second fluid delivery device 142.

In the illustrative embodiment, the combined mixed water stream 49 flows alternatively to the first fluid delivery device 136 and the second fluid delivery device 142 in response to operation of a conventional fluid control device, such as a diverter valve (not shown). The mixed water temperature sensor 52 and the mixed water pressure sensor 56 are positioned within the outer tubular member 130 proximate the inlet end 138 of the inner tubular member 132. As such, the sensors 52 and 56 are configured to detect the temperature and the pressure of the combined mixed water stream 49 flowing through either the outer tubular member 130 to the first fluid delivery device 136 or through the inner tubular member 132 to the second fluid delivery device 142.

In operation of the water delivery system 10, a combined cold water stream 17 is provided by the cold water source 16 and passes through the cold water valve 12 and the cold water inlet 78 into the fluid housing 62 of the fluid mixer 20. Similarly, a combined hot water stream 27 is provided by the hot water source 26 and passes through the hot water valve 22 and the hot water inlet 80 into the housing 62. The directing member 86 defines the cold water pathway 88 for directing the combined cold water stream 17 to the plurality of cold water separating ports 118 of the mixing element 64. Likewise, the directing member 86 defines the hot water pathway 90 for directing the combined hot water stream 27 to the plurality of hot water separating ports 120 of the mixing element 64. The plurality of cold water separating ports 118 separate the combined cold water stream 17 into a plurality of spaced apart component cold water streams 66. Similarly, the plurality of hot water separating ports 120 separate the combined hot water stream 27 into a plurality of spaced apart component hot water streams 68. In the illustrative embodiment, a single component cold water stream 66 and a single component hot water stream 68 is directed into each combination channel 70.

Within each combination channel 70, the geometry of the channel 70 causes the component cold water stream 66 and the component hot water stream 68 to form a component mixed water stream 72. More particularly, the angular positioning of the walls 122, 124, and 126 of each combination channel 70 causes the component cold and hot water streams 66 and 68 to impinge on inwardly facing angled surfaces 71 and 73, and to turbulently mix, thereby forming the component mixed water stream 72. The component mixed water stream 72 then flows axially through the combination channel 70 to the discharge end 104 of the mixing element 64. At the discharge end 104, the plurality of component mixed water streams 72 are combined into a combined mixed water stream 49. It should be noted that in the illustrative embodiment the cold and hot water streams 17 and 27 may be exchanged with each other without adversely affecting operating efficiency.

The combined mixed water stream 49 from each mixing element 64 is then passed into the mixed water outlet 50. The combined mixed water stream 49 next flows in the direction of arrow 144 and past the mixed water temperature sensor 52 and mixed water pressure sensor 56. A conventional diverter valve (not shown) may be operated by the user to determine whether the combined mixed water stream 49 should flow to the first fluid delivery device 136 or the second fluid delivery device 142. If the combined mixed water stream 49 is desired at the first fluid delivery device 136, then the water stream 49 continues to flow in the direction of arrow 144 and out of the mixed water outlet 50 at the discharge end 134 of the outer tubular member 130. Should the mixed water stream 49 be requested at the second fluid delivery device 142, then the water stream 49 flows in the direction of arrow 146 toward the discharge end 140 of the inner tubular member 132.

As noted above, the cold water servo motor 30 and the hot water servo motor 32 may adjust the cold water valve 12 and the hot water valve 22, respectively, to control the temperature of the combined mixed water stream 49. More particularly, a controller may adjust the positions of the cold water valve 12 and the hot water valve 22 in response to signals received from the cold water temperature sensor 34, the cold water pressure sensor 38, the hot water temperature sensor 42, the hot water pressure sensor 46, the mixed water temperature sensor 52, and the mixed water pressure sensor 56.

By separating the combined cold water stream 17 and the combined hot water stream 27, the mixer 20 of the present invention increase the surface area of the temperature gradient boundary between the plurality of component cold and hot water streams 66 and 68. This increased surface area results in improved thermal transfer, resulting in a substantially uniform thermal distribution profile within the combined mixed water stream 49 by the time it reaches the mixed water temperature sensor 52 and prior to exiting the outlet 50.

Although the invention has been described in detail with reference to certain preferred embodiments, variations and modifications exist within the spirit and scope of the invention as described and defined in the following claims.

The invention claimed is:

1. A fluid mixer comprising:
   a housing defining a mixing chamber;
   a cold water inlet in fluid communication with the mixing chamber and configured to supply a combined cold water stream to the mixing chamber;
   a hot water inlet in fluid communication with the mixing chamber and configured to supply a combined hot water stream to the mixing chamber;
   a mixed water outlet in fluid communication with the mixing chamber and configured to receive a combined mixed water stream from the mixing chamber;
   a mixing element received within the housing;
   at least one directing member operably coupled to the mixing element and defining a cold water pathway and a hot water pathway in spaced relation to the cold water pathway, the cold water pathway directing the combined cold water stream from the cold water inlet to the mixing element and the hot water pathway directing the combined hot water stream from the hot water inlet to the mixing clement; and
   wherein the mixing element is configured to separate the combined cold water stream into a plurality of spaced apart component cold water streams, to separate the combined hot water stream into a plurality of spaced apart component hot water streams, and to mix the component cold water streams and the component hot water streams into a plurality of spaced apart component mixed water streams, the mixing element being further configured to combine the plurality of component mixed water streams into a combined mixed water stream provided to the mixed water outlet.

2. The fluid mixer of claim 1, wherein the mixing element includes an outer wall having a first portion in fluid communication with the cold water pathway and a second portion in fluid communication with the hot water pathway, the first portion including a plurality of cold water separating ports configured to create the plurality of component cold water streams, and the second portion including a plurality of hot water separating ports configured to create the plurality of component hot water streams.

3. The fluid mixer of claim 2, wherein the mixing element further includes a plurality of combination channels, each combination channel in fluid communication with at least one of the cold water separating ports and at least one of the hot water separating ports.

4. The fluid mixer of claim 3, wherein the combined cross-sectional area of the plurality of combination channels is at least as great as the combined cross-sectional area of the plurality of cold water separating ports and the plurality of hot water separating ports.

5. The fluid mixer of claim 2, wherein the combined cross-sectional area of the plurality of cold water separating ports is at least as great as the cross-sectional area of the cold water inlet in order to prevent the loss of cold water flow due to back pressure, and the combined cross-sectional area of the hot water separating ports is at least as great as the combined cross-sectional area of the hot water inlet in order to prevent the loss of hot water flow due to back pressure.

6. The fluid mixer of claim 1, further comprising a first check valve operably coupled to the cold water inlet, and a second check valve operably coupled to the hot water inlet.

7. The fluid mixer of claim 1, further comprising a cold water temperature sensor operably coupled to the cold water inlet, a cold water pressure sensor operably coupled to the cold water inlet, a hot water temperature sensor operably coupled to the hot water inlet, and a hot water pressure sensor operably coupled to the hot water inlet.

8. The fluid mixer of claim 1, further comprising a mixed water temperature sensor operably coupled to the mixed water outlet, and a mixed water pressure sensor operably coupled to the mixed water outlet.

9. The fluid mixer of claim 8, wherein the mixed water outlet includes:
an outer tubular member in fluid communication with the mixing element;
an inner tubular member concentrically received within the outer tubular member and having an inlet end positioned within the outer tubular member and a discharge end configured to be coupled to a fluid delivery device; and
wherein the mixed water temperature sensor and the mixed water pressure sensor are coupled to the outer tubular member proximate the inlet end of the inner tubular member.

10. The fluid mixer of claim 9, wherein the cross-sectional area of the inner tubular member is at least as great as the combined cross-sectional area of the cold water inlet and the hot water inlet, and the difference between the cross-sectional area of the outer tubular member and the cross-sectional area of the inner tubular member is at least as great as the combined cross-sectional area of the cold water inlet and the hot water inlet, thereby preventing the loss of mixed water flow due to back pressure.

11. The fluid mixer of claim 1, further comprising:
a cold water valve coupled to the cold water inlet;
a hot water valve coupled to the hot water inlet; and
a controller operably coupled to the cold water valve and the hot water valve, the controller being configured to adjust the cold water valve and the hot water valve to regulate a mixed water temperature of the mixed water to substantially correspond to the desired water temperature.

12. A fluid mixing element comprising:
a longitudinally extending outer wall;
a plurality of cold water separating ports defined within the outer wall;
a plurality of hot water separating ports defined within the outer wall;
a plurality of longitudinally extending combination channels, each combination channel being in fluid communication with at least one of the cold water separating ports and at least one of the hot water separating ports, and separated from the other combination channels to produce a plurality of spaced apart component mixed water streams; and
a discharge end in fluid communication with the plurality of combination channels to combine the plurality of component mixed water streams, wherein each combination channel includes a radially extending first wall, a radially extending second wall connected to the first wall, and an arcuate connecting wall extending between the first wall and the second wall.

13. The fluid mixing element of claim 12, wherein the cross-section of each combination channel is substantially pie-shaped.

* * * * *